United States Patent [19]
Nishino et al.

[11] Patent Number: 4,986,566
[45] Date of Patent: Jan. 22, 1991

[54] SUSPENDING APPARATUS FOR VEHICLES
[75] Inventors: Yutaro Nishino, Hamamatsu; Kihachi Kondoh, Shizuoka, both of Japan
[73] Assignee: Suzuki Jidosha Kogyo Kabushiki Kaisha, Shizuoka, Japan
[21] Appl. No.: 385,909
[22] Filed: Jul. 25, 1989
[30] Foreign Application Priority Data Jul. 29, 1988 [JP] Japan .................. 63-189750
Jul. 29, 1988 [JP] Japan .................. 63-189749

[51] Int. Cl.⁵ ........................... B60G 7/00
[52] U.S. Cl. ......................... 280/688; 280/675; 280/690
[58] Field of Search ............ 280/688, 690, 692, 689, 280/663, 660, 675, 781, 96.1

[56] References Cited
U.S. PATENT DOCUMENTS 4,565,389 1/1986 Kami et al. .................. 280/688
4,570,969 2/1986 Tsutsumi et al. .............. 280/695

FOREIGN PATENT DOCUMENTS 64504 4/1983 Japan .
140110 8/1984 Japan .
10167 1/1985 Japan .
11406 1/1986 Japan .
48443 10/1986 Japan .
1761 1/1987 Japan .
50339 10/1987 Japan .

Primary Examiner—Richard A. Bertsch
Attorney, Agent, or Firm—Flynn, Thiel, Boutell & Tanis

[57] ABSTRACT

A suspending apparatus for vehicles includes a suspension arm having a wheel-side supporting portion and two vehicle body side supporting portions to support a wheel so that the wheel can reciprocate vertically relative to the vehicle body. A first centerline connecting the two vehicle body side supporting portions extends obliquely relative to a second centerline defined by a wheel shaft which supports the wheel. The vehicle body side supporting portions are positioned such that the first centerline passes through a corner portion of a vehicle component, such as a fuel tank. A side surface of the suspension arm between the two vehicle body side supporting portions extends along the corner portion of the vehicle component, while being spaced therefrom. The suspension arm includes a base plate and a subplate, the base plate having a substantially C-shaped cross section. Opposite edges of the subplate are respectively fixedly attached to the free edges of the base plate, and the subplate is bent inwardly relative to the C-shaped section so that a free edge of the subplate is disposed between the side walls of the base plate to form a bent portion which reduces the concentration of stresses in the base plate adjacent the free edge of the subplate.

7 Claims, 18 Drawing Sheets

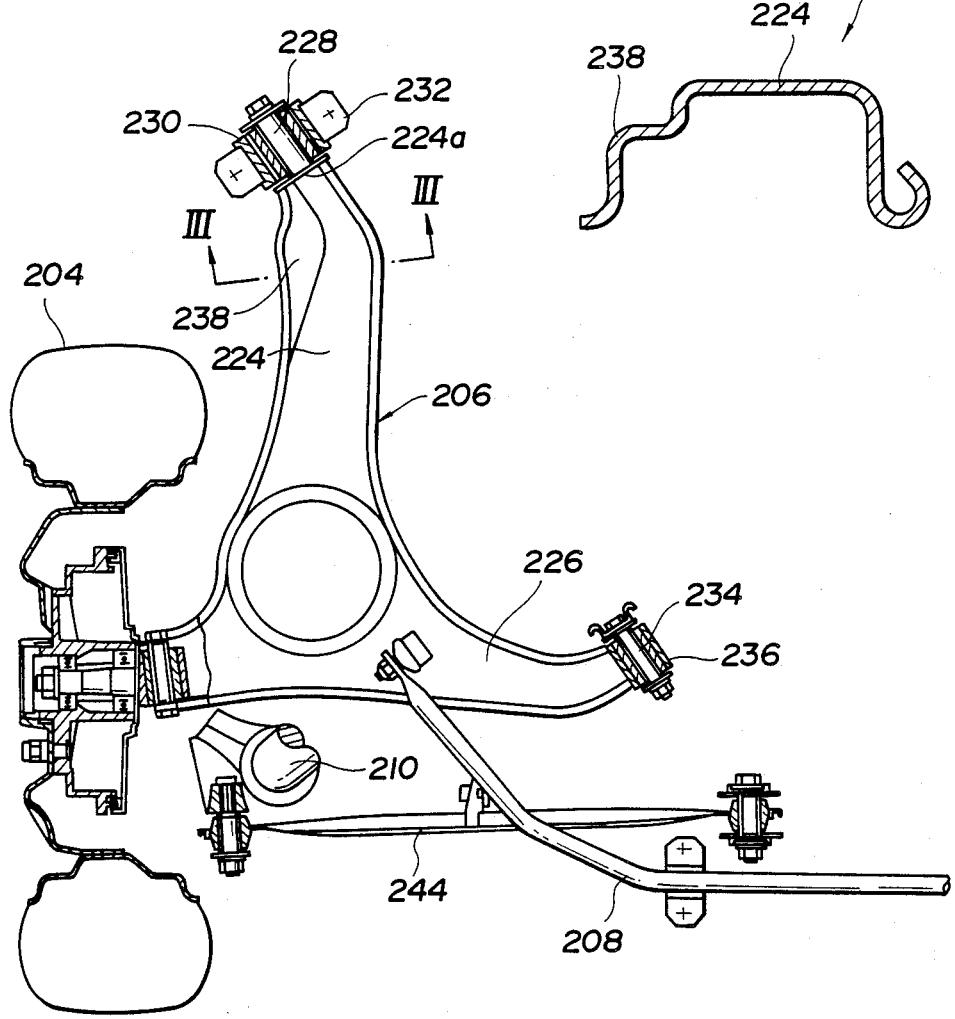

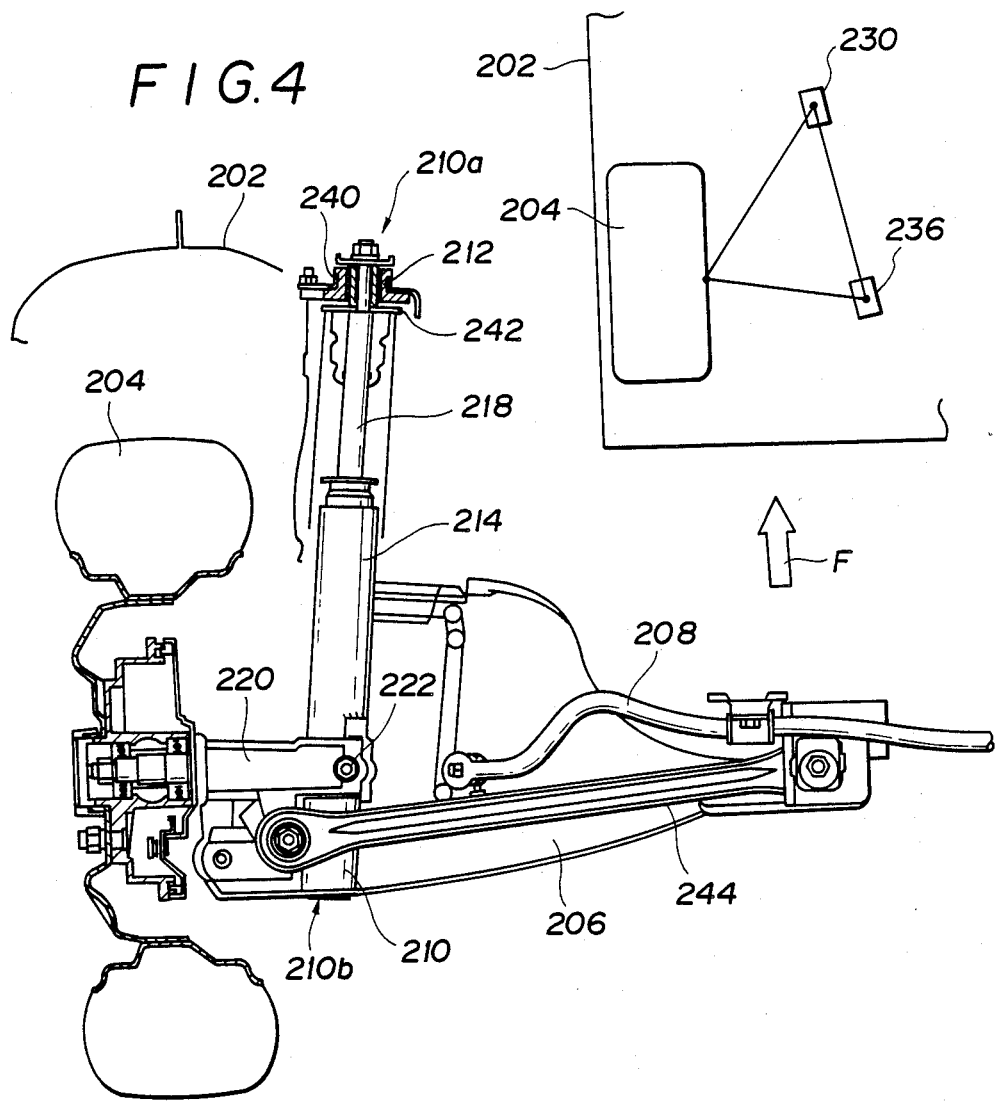

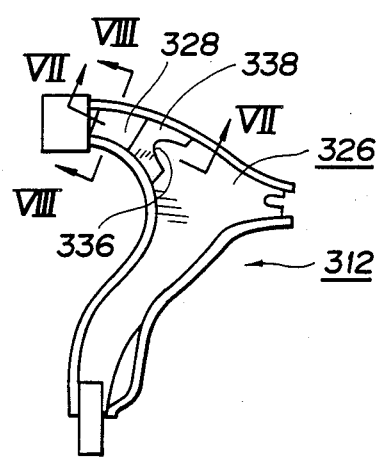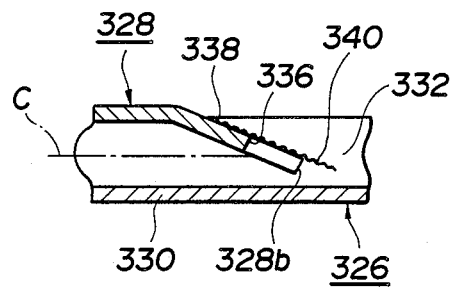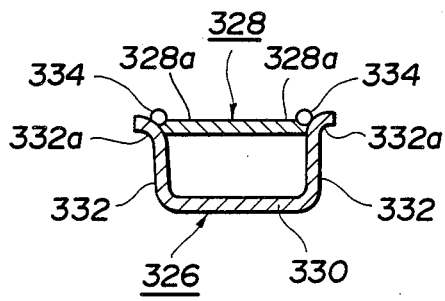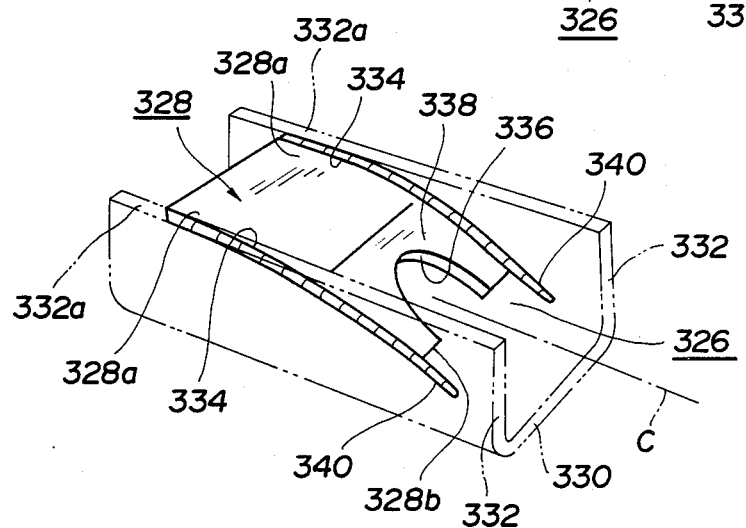

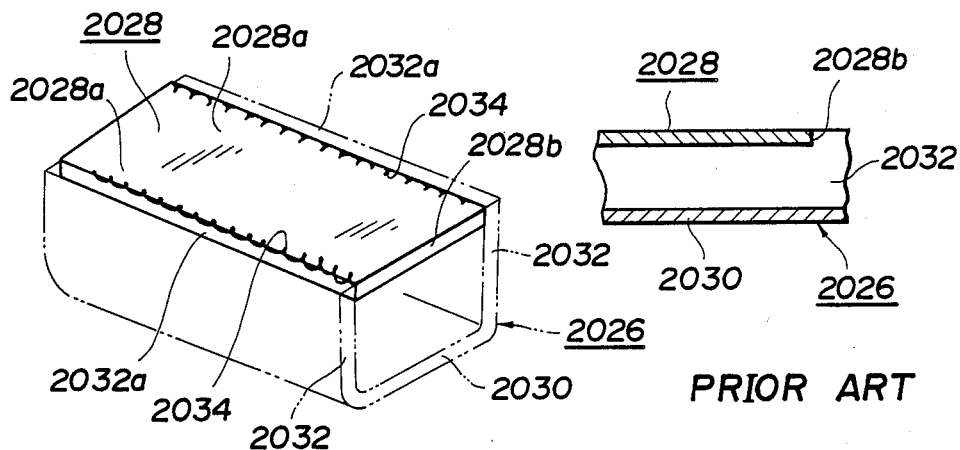
FIG. 22
PRIOR ART
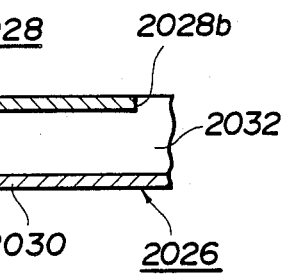
FIG. 24
PRIOR ART
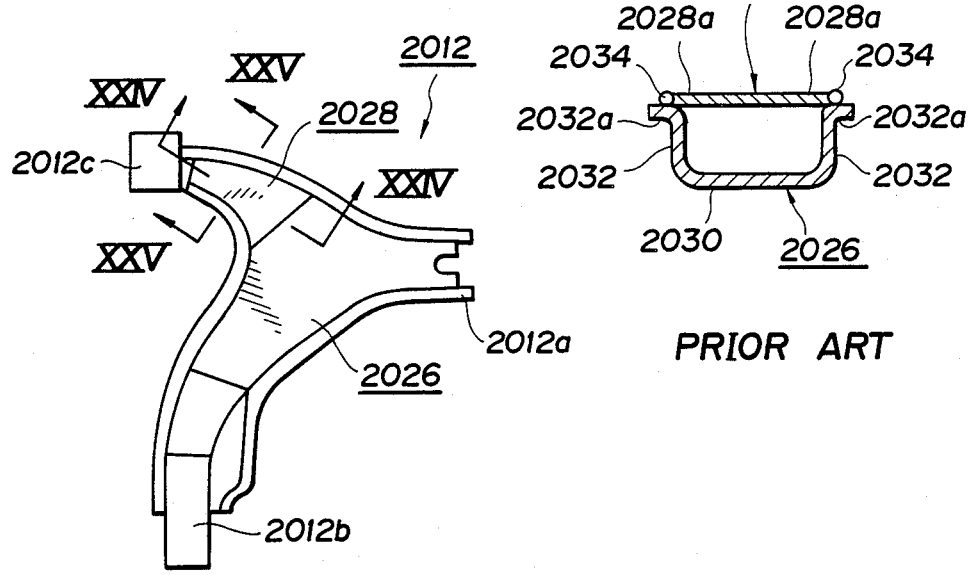
FIG. 23
PRIOR ART
FIG. 25
PRIOR ART

FIG. 26
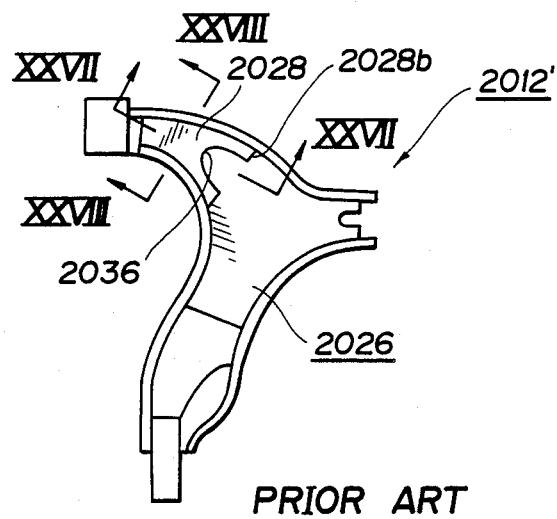
PRIOR ART
FIG. 27
FIG. 28
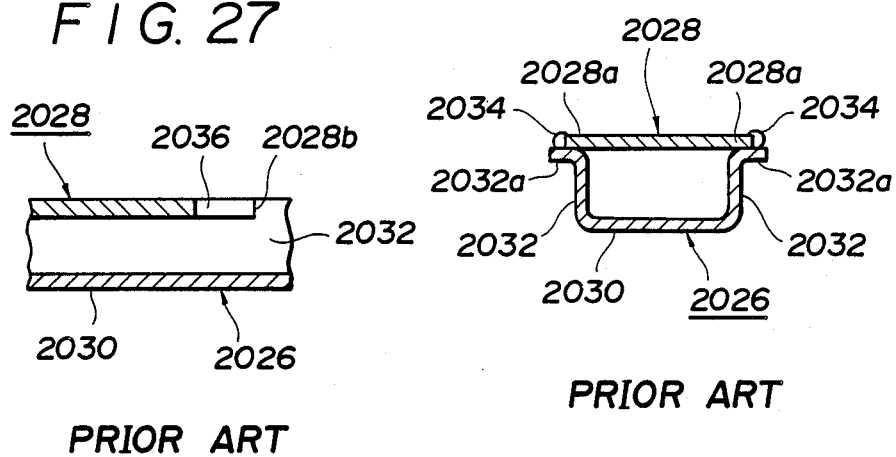
PRIOR ART
PRIOR ART

PRIOR ART

PRIOR ART

PRIOR ART

SUSPENDING APPARATUS FOR VEHICLES

FIELD OF THE INVENTION

The present invention relates to a suspending apparatus for vehicles and, more particularly, to an improved shape for a suspension arm, an improved structure for supporting a suspension arm between a vehicle body and a suspension knuckle, and an improved attaching structure for attaching a strut between a vehicle body and a suspension knuckle.

BACKGROUND OF THE INVENTION

A suspending apparatus for a vehicle functions to support the vehicle body and to buffer vertical motions of the wheels due to uneven road surfaces or the like, thereby preventing the propagation of vibrations, to the vehicle body. Further, the suspending apparatus functions to suppress irregular vibration of the wheels, thereby stabilizing the running state. On the other hand, the suspending apparatus also functions to propagate the driving force, braking force, lateral force, and the like which are caused between the wheels and the road surface, thereby keeping a desired running performance.

Such suspending apparatus for vehicles has been disclosed in, for instance, JP-B-62-50339. According to such apparatus, the subframe is not fixed to the frame of the vehicle body and the side-sill, thereby making it difficult to propagate the vibration from the road surface to the vehicle body, and when the vehicle collides, the shock force which is input from the rear bumper is transferred to the vehicle body frame, thereby improving the safety of passengers in the rear seat.

On the other hand, there is also known as shown in FIG. 21, a suspending apparatus for vehicles which is constructed in a manner such that a suspension arm 1006 comprises a wheel supporting portion 1028 connected with the side of a wheel 1004 and first and second vehicle body side supporting portions 1034 and 1036 connected with the side of a vehicle body 1002. The wheel 1004 is coupled with the vehicle body 1002 by the suspension arm 1006 such that it can be vertically oscillated or reciprocated.

Some vehicles use an independent suspension system in which the right and left wheels are respectively independently suspended. There are various types of independent suspension systems, such as the swing axle type, wishbone type, strut type, and the like. Particularly, according to the strut type, a shock absorber comprising inner and outer cylinder members is used as a part of a suspension link. The lower end of the shock absorber is connected to a lower arm, and the upper end is connected to the vehicle body, whereby the shock absorber prevents propagation of vibration from the wheel to the vehicle body.

Such a suspending apparatus for vehicles has been disclosed in JP-B-61-48443. According to the suspending apparatus for automobiles disclosed in this publication, a lower suspension arm is integrally formed by first and second arm members and is provided in a ball joint attaching portion, the upper wall portion of the first arm member is downwardly lowered and a flat plate-like extending portion is joined to the lower surface of the second arm member to thereby form a closed cross sectional structure, and proper strength can be provided in consideration of the load which is applied to each portion of the suspension lower arm. The weight can be also reduced.

Another known suspending apparatus for vehicles is shown in FIG. 29. In FIG. 29, reference 2002 denotes a knuckle and 2004 indicates a wheel shaft. A wheel hub 2006 is attached to the wheel shaft 2004. A wheel 2010 to which a tire 2008 is mounted is attached to the wheel hub 2006. The knuckle 2002 is supported by a suspension arm 2012. The suspension arm 2012 is formed in an almost A-shape. A supporting portion 2012a of the arm 2012 is attached to a supporting arm 2014 of the knuckle 2002. Supporting portions 2012b and 2012c of the arm 2012 are attached to a vehicle body (not shown) by brackets 2016. Thus, the suspension arm 2012 is supported between the wheel shaft 2004 and the vehicle body such that it can be oscillated. Reference numeral 2018 denotes a strut, 2020 indicates a toe control rod, 2022 a stabilizer, and 2024 a suspension spring.

When parts are coupled to the bottom surface of the vehicle body by using screws, the screws are usually covered by a cover to protect them from stones or the like. The cover is generally fixed to the vehicle body or the like by welding or the like. If it is necessary to replace the parts on the bottom surface of the vehicle body, the cover must be detached every time, and the work is extremely troublesome.

Such a suspending apparatus for vehicles has been disclosed in JP-A-59-140110. According to the mounting structure of a damper unit for the rear wheels of a vehicle disclosed in this publication, when the rear wheels together with the front wheels are steered, the structure is mounted between the damper unit and the attaching member through a bearing, thereby allowing the damper unit for the rear wheels to be relatively smoothly rotated relative to the vehicle body.

In the suspending apparatus for vehicles, a strut mount cover is attached to the vehicle body side edge portion which is provided for attachment to the strut. An attaching structure of a shock absorber cap has been disclosed in Japanese Utility Model Registration Laid-open No. 60-10167. According to such an attaching structure, a groove portion of the cap is fitted to a projecting portion of a lower seat metal of a cushion rubber and a flange portion which comes into contact with the vehicle body or the like is integrally formed to the outer periphery of the lower portion of the cap.

In the suspending apparatus for vehicles, a wheel shaft is axially connected to a steering knuckle to hold a damper. When the damper, usually a strut-like structure, is inserted into a boss portion of the steering knuckle and is held, a holding bracket is fixedly attached to the outer surface of the strut, thereby providing the function of a positioning device, stopper, or the like. A construction to attach such a bracket to the knuckle has been disclosed in, for instance, Japanese Utility Model Registration Laid-open No. 58-64504. According to such a construction, an annular member covering an outer shell, a clamping member to join and hold the knuckle, and a reinforcement rib are integrally formed.

However, in the conventional suspending apparatus for vehicles, as shown in FIG. 21, an oscillating center line $C_1$ passes through the axial centers of first and second supporting pins 1040 and 1042 of the first and second vehicle body side supporting portions 1034 and 1036, which are attached to first and second vehicle body side arm portions 1030 and 1032. The centerline $C_1$ perpendicularly crosses the rotational axis $C_2$ of the wheel shaft 1008. Therefore, the supporting portions 034 and 1036 are located on the central side of the vehicle body 1002. A concave portion 1062 needs to be formed in a corner portion 1038a of a fuel tank 1038 so that the side of the vehicle body 1002 does not come into contact with, that is, interfere with the first vehicle body side supporting portion 1034. Consequently, the shape of the corner portion 1038a of the fuel tank 1038 becomes complicated, causing problems in that the manufacturing processes become complicated, the costs rise, and the capacity of the fuel tank 1038 decreases. To solve such problems, if the length of the first arm portion 1030 of the suspension arm 1006 is reduced, other problems occur such that steering stability and riding feeling deteriorate, oscillation and noises increase, and the suspending performance deteriorates. Therefore, improvement is desirable.

In the conventional suspending apparatus for vehicles, at least one of the attaching end portions of the first arm member (extending from the attaching position of the wheel on the lower arm to the rear side) and the second arm member (extending contrarily from the attaching position of the wheel to the front side) is constructed by a pin or bush and a bracket. If a large external force is applied to the lower arm from the front direction of the vehicle body due to a collision, since the first arm member is fixed to the vehicle body by the bush, the bush of the first arm member does not support the load caused by the large external force in terms of the construction.

Therefore, when an external force is applied due to a collision from the front or rear direction of the vehicle body, the vehicle body is largely deformed and the load in the direction of the rotary shaft of the first arm member is not supported, so that there occurs a problem such that the bush comes out of the bracket. The lower arm is not deformed at all by a collision, as compared with the deformation of the vehicle body, so that it will be obvious that the lower arm does not absorb the energy upon collision. Thus, the vehicle body absorbs substantially all of the energy upon collision, and the vehicle body is largely deformed.

In FIGS. 22 to 29, the suspension arm 2012 comprises a base plate 2026 and a subplate 2028 for reinforcement as shown in FIGS. 22 to 28. The base plate 2026 is formed so as to have an almost C-shaped cross section by a flat plate portion 2030 and side wall portions 2032 which are arranged on both sides of the flat plate portion 2030 so as to face them. Fixing side edges 2028a of the subplate 2028 are fixedly attached by welding portions 2034 to edges 2032a of the opposite side wall portions 2032 of the base plate 2026, respectively. Thus, as shown in FIG. 22, the suspension arm 2012 is formed in a manner such that the fixing side edges 2028a of the subplate 2028 for reinforcement are fixedly attached to the edges 2032a of the opposite side wall portions 2032 of the C-shaped base plate 2026.

Japanese Utility Model Registration Laid-open No. 61-11406, discloses a suspension arm in which both edge portions of a pair of base plates each having an almost C-shaped cross section are fixedly attached so as to face each other, thereby forming a cylinder body. A subplate for reinforcement is fixedly attached between both of the edge portions. On the other hand, Japanese Utility Model Registration Laid-open Publication No. 62-1761 discloses a suspension arm constructed from two base plates by making the shapes of respective portions thereof different so that the structure of the arm corresponds to different loads acting on the respective portions thereof.

However, in the suspension arm 2012 shown in FIGS. 23 to 25, since the cross section of the suspension arm 2012 at an edge 2028b on the free side of the subplate 2028 changes, there is a problem in that a concentration of stress is caused. To solve such a problem, as shown in FIGS. 26 to 28, there has been proposed the suspension arm 2012' in which a change in cross section is reduced by providing a curved cutting portion 2036 for the free side edge 2028b of the subplate 2028. However, even if the cutting portion 2036 is provided for the free side edge 2028b of the subplate 2028, since the cross section cannot be changed so as to be gradually reduced, there is a problem in that the concentration of stress cannot be sufficiently reduced. There is also a problem in that a concentration of stress is caused in the portion of the free side edge 2028b due to thermal influence by the welding portions 2034 of the base plate 2026 and subplate 2028.

In the conventional suspending apparatus for vehicles, as shown in FIGS. 30 and 31, an outer diameter of the portion of a lower edge 3110b of a strut 3110 is equal to outer diameters of the other portions of the strut 3110. Therefore, attaching the portion of the lower edge 3110b of the strut 3110 to the knuckle 3120 is difficult, and such a structure is practically disadvantageous. When the portion of the lower edge 3110b of the strut 3110 is attached to a knuckle 3120, a portion of an upper edge 3110a of the strut 3110, that is, a strut mount 3118 largely projects into a vehicle body 3102 as shown in FIG. 30.

Therefore, when the strut 3110 is used on the rear side, the strut 3110 largely protrudes into the vehicle body interior. Thus, there are problems such that the angle of inclination of the back seat must decrease, the width of the back seat must be small, and the space in the interior for a baggage chamber or the like decreases. Thus, the interior space cannot be effectively used. On the other hand, when the strut 3110 is used on the front of a vehicle, the strut mount 3118 of the upper edge 3110a of the strut 3110 projects into the vehicle engine compartment, so that the available space in the engine compartment is reduced and cannot be effectively used. Further, since the strut 3110 projects into the vehicle body 3102, there is a problem of large danger. In addition, if the portion of the upper edge 3110a of the strut 3110 is covered, the projecting amount further increases.

In the conventional suspending apparatus for vehicles as shown in FIG. 32, a strut mount 4028 is supported by first and second supporting members 4030 and 4032 from the outside and the inside, respectively, and projects through the side of a vehicle body 4004. An attaching portion 4020, which penetrates the strut mount 4028 and also projects through the side of the vehicle body 4004, is provided in one edge portion of a strut 4012. A cover 4134 covers only the edge portion of the attaching portion 4020 which projects through the side of the vehicle body 4004. Although the cover 4134 shown in FIG. 32 is small and has a small manufacturing cost, since the strut 4012 and cover 4134 integrally vibrate in association with the vibration and noises on the side of the strut 4012, the vibration and noises on the side of the strut 4012 are enhanced and such a structure is practically disadvantageous.

On the other hand, a cover 4234 shown in FIG. 33 is attached to the vehicle body 4004 in order to cover the attaching portion 4020 of the strut 4012 projecting through the vehicle body 4004 and the strut mount 4028 projecting through the vehicle body 4004. Although the cover 4234 can avoid the problems of the cover 4134 shown in FIG. 32, it is large, so as to cover both the attaching portion 4020 of the strut 4012 projecting through the vehicle body 4004 and the strut mount 4028. Consequently, due to the increased size of the cover 4234, the manufacturing cost increases.

In the conventional suspending apparatus for vehicles, the strut does not have a supporting structure from which it may be hung or supported when the outer surface of the strut is subjected to a surface treatment such as coating, plating, or the like. Consequently, the surface treating work is troublesome. If a supporting member such as a bracket or the like is attached to the strut, the number of parts increases and the apparatus becomes more expensive.

SUMMARY OF THE INVENTION

It is an object of the present invention to provide a suspending apparatus for vehicles including a suspension arm having first and second vehicle body side supporting portions which are desirably positioned. The suspension arm is formed so that there is no need to change the shape of existing vehicle components, whereby the existing vehicle components can be easily manufactured without additional expense, the steering stability and the riding feeling of the vehicle is improved, vibration and noise are suppressed, and the suspension performance is improved.

According to an embodiment of the present invention, the above object is accomplished by a suspending apparatus for a vehicle in which a lower arm is integrally formed by a first arm member extending from the attaching position of a wheel toward the front side of the vehicle and a second arm member extending from the attaching position of the wheel toward the inside of the vehicle body. An attaching edge portion of the first arm member is attached to the vehicle body through a bracket. A projecting portion having a cross sectional shape larger than the bracket is provided in the attaching edge portion. Therefore, when an external force is applied to the vehicle body from the front or rear side due to a collision, the projecting portion formed in the first arm member absorbs the energy upon collision, the deformation of the vehicle body upon collision is reduced, and the rigidity of the vehicle body is improved. The attaching performance of the lower edge portion of the strut can be improved. Further, the projecting portion of the first arm member does not complicate the construction of the lower arm, whereby costs can be reduced.

A suspension arm is provided which includes a generally C-shaped base plate having opposed sidewall portions, and a subplate having fixing edges which are attached to the side walls. Free side edges of the subplate are bent to extend toward a neutral axis of the suspension arm and a bending portion is formed, so that a cross sectional coefficient can be gradually decreased. Therefore, the concentration of the stresses at the free side edges of the subplate can be reduced. Due to the reduction of the concentration of the stresses, the plate thickness can be reduced, and the weight and cost can be reduced. In addition, the durability and quality of the suspension arm can be improved. The cross sectional coefficient can be further decreased, for example, by forming a cutting portion at the free side edges of the bending portion of the subplate, whereby the concentration of stresses can be further reduced. Moreover, welding portions between the side wall portions of the base plate and the fixing side edges of the bending portion of the subplate are extended from the free side edges of the subplate toward the neutral axis of the suspension arm to form extension welding portions in the side wall portions of the base plate. Thus, the concentration of stresses due to thermal influence can be reduced, so that in addition to the decrease in the cross sectional coefficient, the concentration of the stresses can be further reduced.

A bracket is provided in which an opening is defined by a peripheral wall, and a flange-shaped portion which is projected inwardly is formed at the lower edge of the peripheral wall and surrounds the opening. Parts are coupled with the peripheral wall of the bracket by using bolts. The bolts and associated nuts are covered by the peripheral wall and flange-shaped portion of the bracket, so that they are protected from stones or the like. On the other hand, when parts are exchanged or the like, the particular bolt or nut can be accessed to be attached or detached through the opening formed in the flange-shaped portion without detaching the bracket. The attaching/detaching process can be easily executed.

An outer diameter of the lower edge portion of a strut connecting a lower arm with the vehicle body, which lower edge portion is attached to a suspension knuckle, is set to a small diameter so as to reduce a projecting amount of the strut upper edge portion into the vehicle body, and so that the strut can be easily inserted into the knuckle and the working efficiency can be improved. Therefore, when such a strut is used on the rear side of the vehicle, the angle of inclination of the back seat can be increased, the width of the back seat can be enlarged, the space in the vehicle interior such as a baggage chamber or the like can be increased, and such structure is practically advantageous. Further, when the strut is used on the front side of a FF type automobile, a projecting amount of the upper edge portion of the strut into the engine compartment is small, so that the space therein can be effectively used. Moreover, because the amount by which the strut projects into the vehicle body is reduced, danger can be avoided, the size of a cover to cover a strut mount can be reduced, and the cost can be reduced. Further, a bore tolerance of the knuckle can be decreased, and the stress of the knuckle after the strut is attached can be reduced. Therefore, damage to the knuckle caused by stress can be substantially prevented, and the use life of the knuckle can be prolonged.

An attaching portion which penetrates the strut mount and fixes and is projected into the vehicle body side is provided at one end of the strut. A cover portion is provided to cover the attaching portion by coming into engagement with the peripheral edge portion of a first supporting member which supports the strut mount in the outside direction. Therefore, the durability between the strut mount and the attaching portion can be improved and vibration and noises from the strut can be reduced. Such a structure is practically advantageous. Since the cover portion is in engagement with the peripheral edge portion of the first supporting member, the size of the cover portion can be reduced, thus reducing the cost of the material. The space in the vehicle can be increased due to the reduced size of the cover portion.

A part of a holding bracket which is used to hold a damper is bent and projected so that a projecting portion is formed. A supporting arrangement is provided on the projecting portion. Thus, the damper can be easily handled, surface treating work or the like performed on the damper can be easily executed, there is no need to attach a separate supporting member, and the cost can be reduced.

BRIEF DESCRIPTION OF THE DRAWINGS

FIG. 2 is a schematic plan view of a suspending apparatus for vehicles according to a first variation;

FIG. 3 is an enlarged cross sectional view taken along line III—III in FIG. 2;

FIG. 4 is a schematic front view of the suspending apparatus of FIG. 2; and

FIG. 5 is an explanatory diagram of external forces acting on first and second arm members of the lower arm.

FIG. 6 is a plan view of a suspension arm according to a second variation of the invention;

FIG. 7 is an enlarged cross sectional view taken along line VII—VII in FIG. 6;

FIG. 8 is an enlarged cross sectional view taken along line VIII—VIII in FIG. 6; and FIG. 9 is an enlarged perspective view of the subplate of FIG. 6.

FIG. 22 is an enlarged perspective view of a conventional subplate.

FIG. 23 is a plan view of a conventional suspension arm;

FIG. 24 is an enlarged cross sectional view taken along the line XIV—XIV in FIG. 23; and FIG. 25 is an enlarged cross sectional view taken along the line XXV—XXV in FIG. 23.

FIG. 26 is a plan view of a further conventional suspension arm;

FIG. 27 is an enlarged cross sectional view taken along the line XXVII—XXVII in FIG. 26; and FIG. 28 is an enlarged cross sectional view taken along the line XXVIII—XXVIII in FIG. 26.

Figure 1:
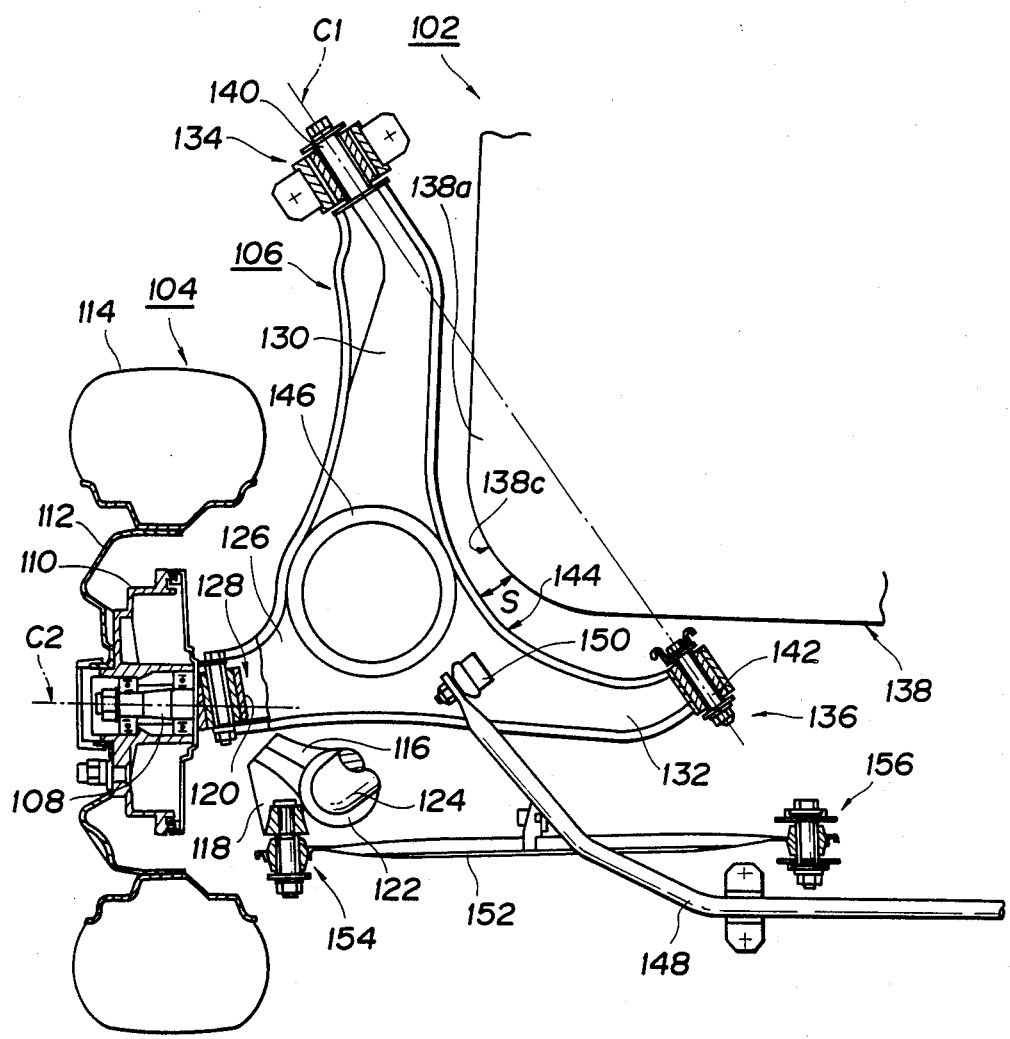
FIG. 1 shows a schematic plan view of a suspending apparatus for vehicles which embodies the present invention.

Certain terminology is used herein for convenience in reference only and is not to be considered limiting. For example, the words "forward", "backward", "front" and "rear" will designate directions in the drawings to which reference is made. Such terminology will include the words specifically mentioned, derivatives thereof and words of similar import.

DETAILED DESCRIPTION

In FIG. 1, reference numeral 102 denotes a vehicle body, 104 indicates a wheel assembly, and 106 a suspension arm. The wheel assembly 104 is constructed by attaching a tire 114 to a hub 110 and wheel 112 fixed to a wheel shaft 108. The wheel shaft 108 is coupled with a suspension knuckle comprising an arm 116 for holding a strut 124, an arm 118 for holding a toe control rod 152, and an arm 120 for holding the suspension arm 106. The strut 124 is held to a boss portion 122 of the arm 116 for the strut.

A wheel-side supporting portion 128 attached to a wheel-side arm portion 126 of the suspension arm 106 is attached to the arm 120 of the suspension knuckle. First and second vehicle body side supporting portions 134 and 136, which are connected to the vehicle body 102, are attached to edge portions of first and second vehicle body side arms 130 and 132 of the suspension arm 106, respectively.

The first and second vehicle body side supporting portions 134 and 136 are arranged so as to ride over a corner portion 138a of a vehicle fuel tank 138. That is, the oscillating centerline $C_1$ connecting the axial center of a first supporting pin 140 of the first supporting portion 134 and the axial center of a second supporting pin 142 of the second supporting portion 136 does not perpendicularly cross the rotating centerline $C_2$ of the wheel shaft 108, but rather extends obliquely relative thereto. The centerline $C_1$ extends directly through the corner portion 138a of the tank 138. The suspension arm 106 is pivoted on the coaxial pins 140 and 142 about the centerline $C_1$.

A side surface 144 of the suspension arm 106 as it extends between the first and second supporting portions 134 and 136 is formed so as to be spaced from the fuel tank 138 by a predetermined interval S. Thus, the arm 106 does not interfere with fuel tank 138, even when it oscillates along a corner tank surface 138c.

Further, one end of a vertically standing spring 146 is mounted centrally of the suspension arm 106. One end of a stabilizer 148 is fixed to the suspension arm 106 by a stabilizer holding device 150. One end of the toe control rod 152 is attached to an end portion of the knuckle arm 118 by a holding portion 154. The other end of toe control rod 152 is coupled with the vehicle body 102 by a rod holding portion 156.

The suspension arm 106 is spaced from the fuel tank 138 by the interval S in a manner such that the fuel tank 138 and suspension arm 106 do not contact or interfere with each other even when the arm side surface 144 oscillates adjacent the tank corner surface 138c. The wheel-side supporting portion 128 of arm 106 is attached to the arm 120 for the suspension knuckle. Thus, the supporting portion 134 of first arm 130 is located at a side (lateral) position on the vehicle body 102. The supporting portion 136 of second arm 132 is located at a central position on the vehicle body 102. Therefore, the oscillating centerline $C_1$ connecting the supporting portions 134 and 136 does not perpendicularly cross the rotating centerline $C_2$ of the wheel shaft 108, but rather extends obliquely relative thereto. Thus, even when the fuel tank 138 and/or suspension arm 106 oscillates, the fuel tank 138 and the adjacent side surface 144 of the suspension arm 106 do not come into contact with each other.

Further, since the side surface 144 of the suspension arm 106 is formed and positioned so as to extend along the tank corner surface 138c and positioned so as to extend, there is no need to change the shape of the corner portion 138a of the fuel tank 138. The shape of the corner portion 138a of the tank 138 can be simplified, and manufacturing costs and the like can be reduced. Because there is no need to form a concave portion for the corner portion 138a of the tank 138, the capacity of the fuel tank 138 can be increased.

Further, the lengths of the first and second arm portions 130 and 132 of the suspension arm 106 need not be limited to avoid interference with the tank 138 and thus can be sufficiently long. The steering stability and riding feeling can thus be improved, and vibration, noises, and the like can be reduced.

FIGS. 2 to 5 show a first variation of the invention. In FIGS. 2 and 4, reference numeral 202 denotes a vehicle body of an automobile, 204 indicates a wheel, 206 a lower (suspension) arm, and 208 a stabilizer. The vehicle body 202 and lower arm 206 are coupled by a strut 210. The strut 210 has an outer cylinder member 214 and a reciprocal piston rod 218. An upper end portion 210a of the strut 210 is attached to the vehicle body 202 by the piston rod 218. A strut mount 212 is arranged between the piston rod 218 and the vehicle body 202. A lower end portion 210b of the strut 210 is attached to knuckle 220 by a clamping bolt 222.

The lower arm 206 is A-shaped and integrally formed by a first arm member 224 extending forward from the attaching position of the wheel 204 and a second arm member 226 extending inward and slightly backward from the attaching position of the wheel 204 (see FIG. 5). A first pin 228 is provided for the first arm member 224. A first bush 230 is fitted around the first pin 228 and attached to the vehicle body 202 by a first bracket 232. Referring to the second arm member 226, a second bush 236 is attached to the vehicle body 202 by a second pin 234.

A projecting portion 238 is provided on an attaching end portion 224a of the first arm member 224 so as to have a cross sectional shape larger than the cross sectional shape of the first bracket 232. In more detail, as shown in FIG. 3, the attaching end portion 224a of the first arm member 224 is set to different heights and projects laterally of the first arm member 224, thereby forming the sidewardly projecting portion 238.

FIG. 4, reference numeral 240 denotes a first supporting member on the vehicle side for supporting the strut mount 212, 242 indicates a cylindrical second supporting member which is attached to the outer periphery of the piston rod 218, and 244 is a toe control rod.

When an external force F (FIG. 5) is applied to the vehicle body 202 from, for instance, the rear side by a collision, the projecting portion 238 of the first arm member 224 is deformed to absorb the energy upon collision. The deformation of the vehicle body 202 upon collision is reduced due to the large cross sectional shape formed by the projecting portion 238 in the attaching end portion 224a. The rigidity of the vehicle body 202 can be improved without deforming the first bracket 232. The attaching efficiency of the portion of the lower edge 210b of the strut 210 is improved. Moreover, when the projecting portion 238 is formed on the first arm member 224, the construction of the lower arm 206 does not become complicated, and it is therefore economical to produce.

In FIGS. 2-5, the attaching end portion 224a of the first arm member 224 has been set to different heights and projected laterally of the first arm member, thereby forming the projecting portion 238. However, it is sufficient to form the projecting portion such that the end portion 224a has a cross sectional shape larger than the bracket 232, and other shapes are thus possible. FIGS. 6 to 9 show a second variation of the invention. A suspension arm 312 comprising a base plate 326 and a subplate 328 for reinforcement is supported between a wheel shaft and a vehicle body (not shown) so that it can oscillate. The base plate 326 is generally U-shaped and includes a flat plate portion 330 and upstanding side wall portions 332 which are arranged on both sides of the flat plate portion 330 so as to face each other. Side edges 328a of the subplate 328 are fixedly attached to respective edges 332a of the opposite side wall portions 332 by welds 334.

A bent portion 338 is formed by directing and bending the subplate 328 so that a free edge 328b thereof is directed inwardly toward a central longitudinal axis C of the suspension arm 312 (that is, the free edge 328b is bent downwardly between the side wall portions 332), thereby reducing the concentration of stresses in the suspension arm 312 in the vicinity of the subplate 328. A concave cut-out or recess 336 is formed at the free edge 328b. Further, the welds portions 334 are extended beyond the free side edges 328b inwardly toward the neutral axis C, thereby providing weld extensions 340.

By bending the bent portion 338 inwardly toward the neutral axis C, the cross sectional coefficient (i.e., moment of inertia, or section modulus) of the arm can be gradually reduced. Therefore, as mentioned above, the concentration of stresses at the free side edges 328b and 322a can be reduced. Due to the reduction of the stress concentration, plate thicknesses can be reduced, and the weight and cost can be decreased. In addition, the durability of the suspension arm 312 can be improved.

In FIGS. 6-9, since the concave cut-out portion 336 is formed at the free end edge 328b of the bent portion 338, the cross sectional coefficient and stress concentration can be reduced. Moreover, by providing the weld extensions 340, the concentration of stresses due to thermal influence can be reduced.

Figure 10:
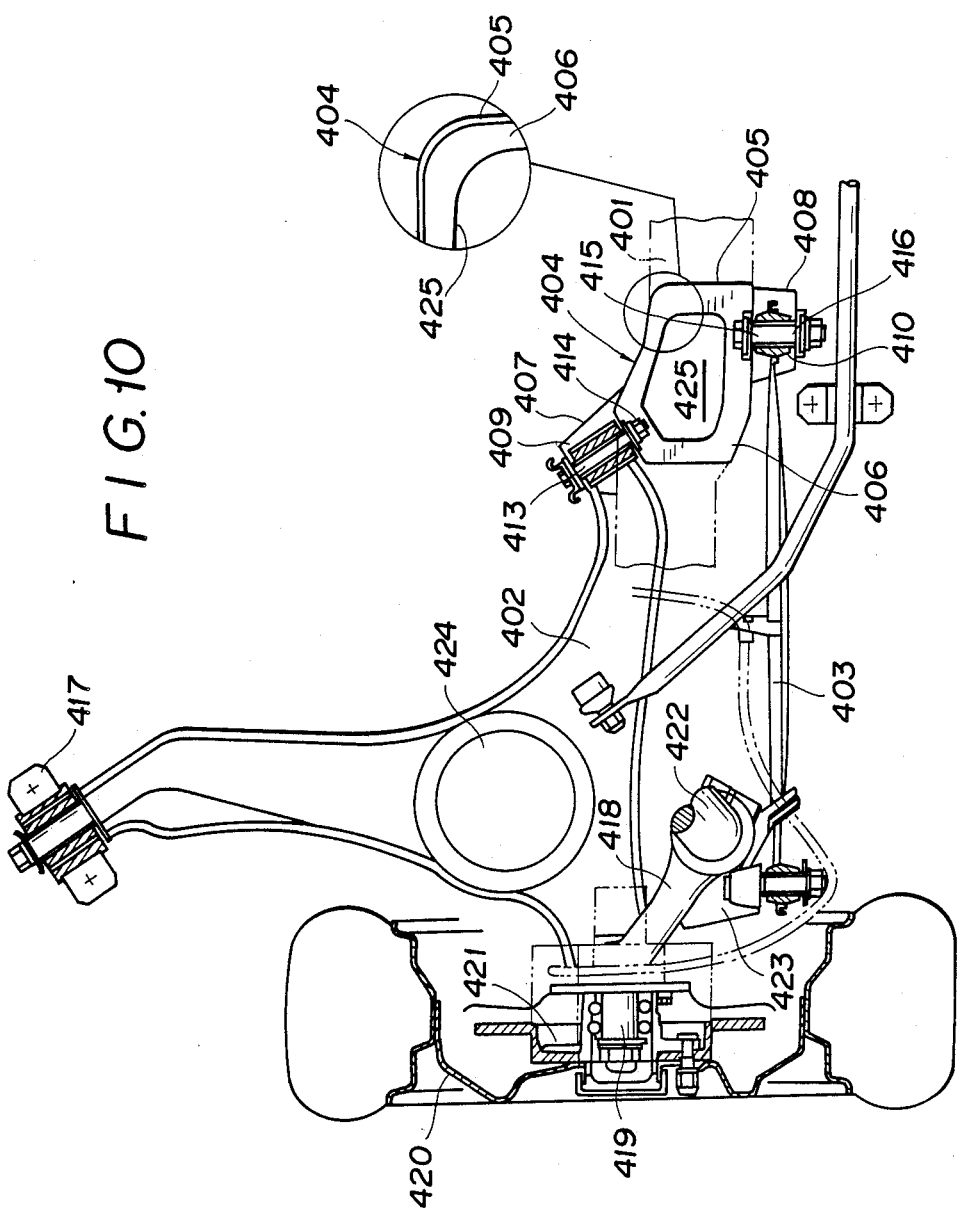
FIG. 10 is a plan view with a part cut away showing a suspending apparatus for vehicles according to a third variation of the invention.
Figure 11:
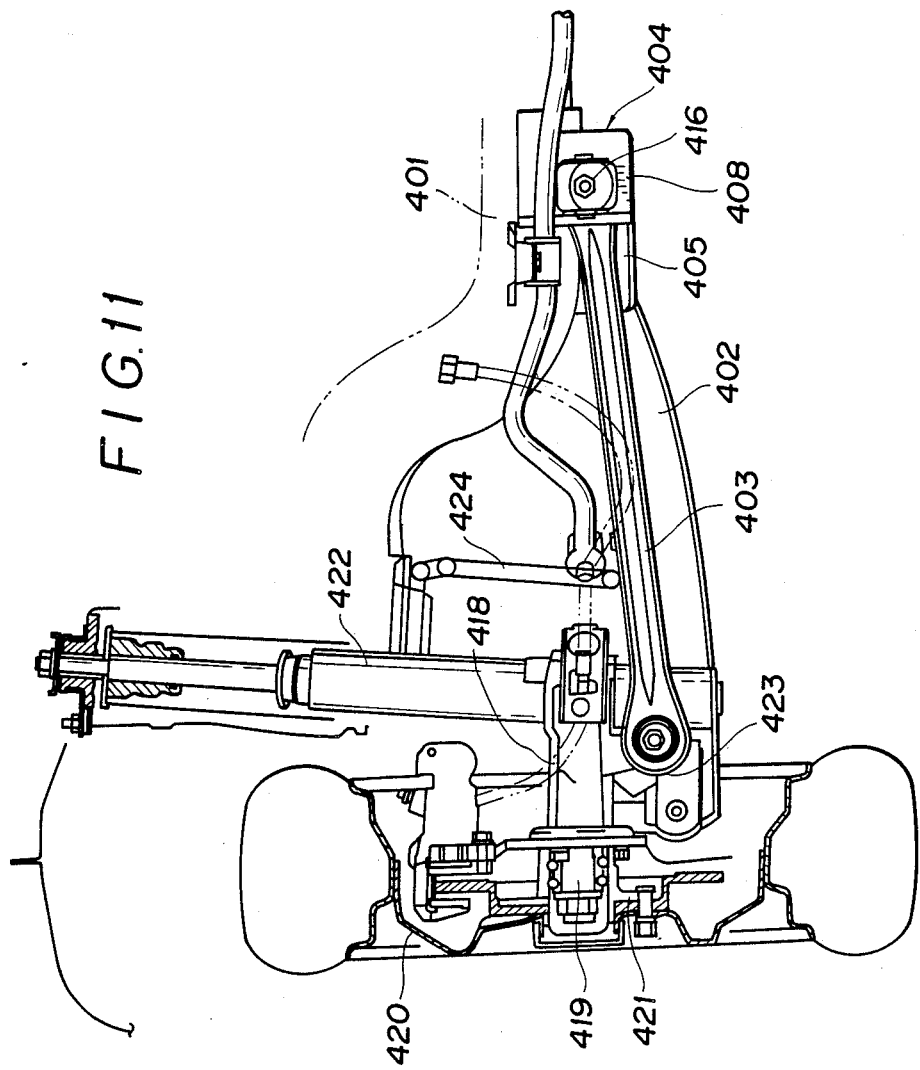
FIG. 11 is a front view of FIG. 10 with part cut away.

FIGS. 10 and 11 show a third variation wherein one end of a lower control (i.e., suspension) arm 402 and one end of a toe control rod 403 are coupled to a bracket 404 by using bolts or screws, which bracket 404 is fixed to the vehicle body by being attached to the underside of a frame cross member 401. The bracket 404 has a peripheral wall 405. An inwardly projecting flange portion 406 is provided at a lower edge of the peripheral wall 405. Braces 407 and 408 are welded at two positions on the peripheral wall 405. Bolt holes 409 and 410 respectively extend through the braces 407 and 408 and through the peripheral wall 405 of the bracket 404. An upper portion of the bracket 404 is fitted so as to at least partially surround (FIG. 11) and is fixed to the cross member 401 by welding. One end of the lower control arm 402 is coupled with the brace 407 by a bolt 413 penetrating the hole 409 and a nut 414. One end of the toe control rod 403 is coupled with the brace 408 by a bolt 415 penetrating the hole 412 and a nut 416. Another end of the lower control arm 402 is connected to a bottom portion of the vehicle body by a bracket 417.

A knuckle 418 is fixed to the remaining end of the lower control arm 402. The knuckle 418 has at one end a spindle 419. A hub 421 of a wheel 420 is loosely fitted to the spindle 419. The knuckle 418 is extended obliquely backwardly from the spindle 419 and holds a strut 422 by its extension end. A boss 423 is formed at the extension end of the knuckle 418. The other end of the toe control rod 403 is held by the boss 423. A coil spring 424 is arranged between the central portion of the lower control arm 402 and the bottom surface of the vehicle body.

In the suspending apparatus for vehicles constructed as mentioned above, the lower control arm 402 and the toe control rod 403 are coupled with one bracket 404 by using bolts. The nut 414 and bolt 415 are protected from stones or the like by the peripheral wall 405 and flange portion 406 of the bracket 404. When the lower control arm 402 or toe control rod 403 is assembled or removed, the nut 414 or bolt 415 is attached or detached through an opening 425 formed by the flange portion 406.

In FIGS. 10–11, a coupling structure in which the lower control arm 402 and toe control arm 403 are coupled to the vehicle body has been shown as an example. However, the invention is not limited to such a coupling of those parts but can be also applied to a coupling of other parts. Although the bolt 413 and nut 416 are not protected from stones or the like, they can be also protected by using a bracket similar to that in the above embodiment.

Figure 12:
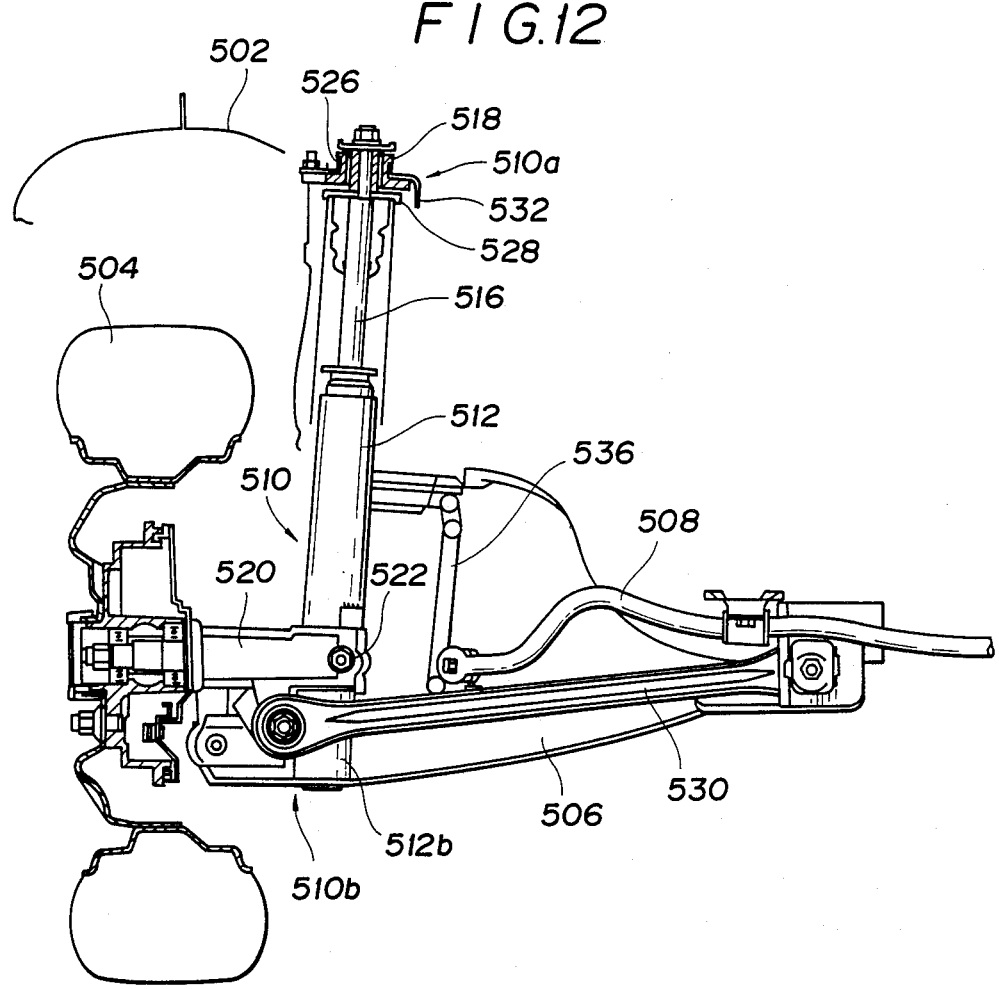
FIG. 12 is a schematic enlarged front view of a suspending apparatus for vehicles according to a fourth variation of the invention.
Figure 13:
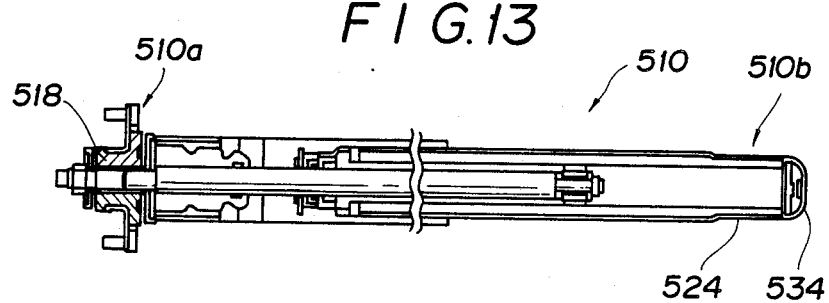
FIG. 13 is a schematic enlarged cross sectional view of the strut of FIG. 12.
Figure 14:
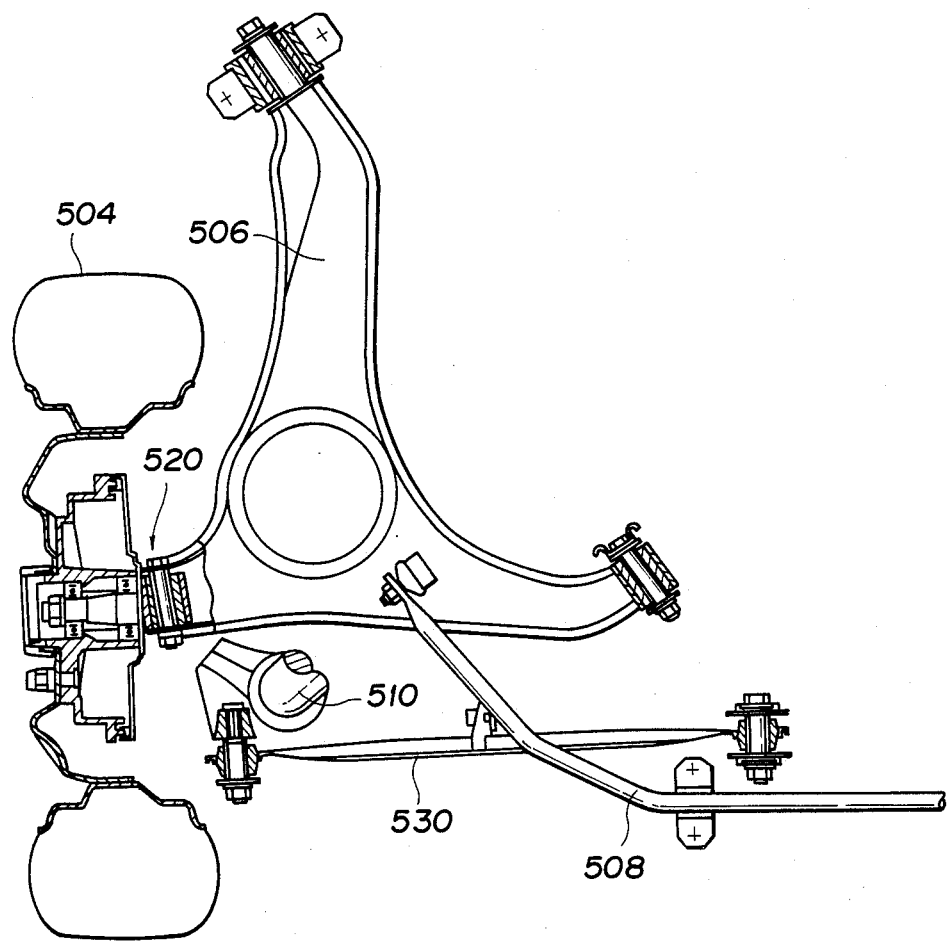
FIG. 14 is a schematic enlarged plan view of the suspending apparatus of FIG. 12.

FIGS. 12 to 14 show a fourth variation wherein reference numeral 502 denotes a vehicle body, 504 indicates a wheel, 506 a lower (i.e. suspension) arm, and 508 a stabilizer. A strut 510 is provided to couple the vehicle body 502 with the lower arm 506. The strut 510 has an outer cylinder member 512 and a piston rod 516. An upper end portion 510a of the strut 510 is attached to the vehicle body 502 by the piston rod 516. A strut mount 518 is arranged between the piston rod 516 and the vehicle body 502. A lower end portion 510b of the strut 510 is attached to a knuckle 520 by a clamping bolt 522. The knuckle 520 is also connected to the arm 506. As shown in FIG. 13, a height difference portion 524 is formed in the lower end portion 510b of the strut 510, that is, the lower end portion 512b of the outer cylinder member 512 has a smaller outer diameter than the other portions of the outer cylinder member 512.

Reference numeral 526 denotes a first supporting member on the side of the vehicle body for supporting the strut mount 518, 528 indicates a cylindrical second supporting member which is attached to the outer periphery of the piston rod 516, 530 denotes a toe control rod, 532 denotes a cover to cover the strut mount 518, 534 denotes a cap portion to cover the lower edge 510b of the strut 510, and 536 denotes a coil spring.

When the strut 510 is attached, the upper end portion 510a is attached to the vehicle body 502 through the first and second supporting members 526 and 528 and the strut mount 518, and the lower end portion 510b is attached to the knuckle 520 by the clamping bolt 522. By forming the portion 524 having a smaller diameter in the lower end portion 510b of the strut 510, the strut 510 can be easily inserted and attached into the knuckle 520, and installation efficiency is improved. Further, since the lower end portion 510b of the strut 510 can be deeply inserted into the knuckle 520, only a small amount of the upper end portion 510a of the strut 510 projects into the vehicle body 502. Thus, when the strut 510 is used on the rear of the vehicle, the width and angle of inclination of the back seat are less restricted by the protruding strut. Moreover, the vehicle interior space, including a baggage chamber or the like, can be increased.

Further, when the strut 510 is used on the front side of an FF type automobile, only a small part of the upper end portion 510a projects into the engine compartment, so the space therein can be effectively used. In addition, since the amount by which the strut 510 projects into the vehicle body 502 is reduced, safety is enhanced, the size of the cover 532 which covers the strut mount 518 can be reduced, and thus the cost can be reduced.

On the other hand, since the bore tolerance of the knuckle 520 can be reduced, the stress of the knuckle 520 after the strut 510 is clamped by the clamping bolt 522 can be reduced. Damage of the knuckle 520 by stress can thus be minimized or prevented, prolonging the useful life of the knuckle 520.

Figure 15:
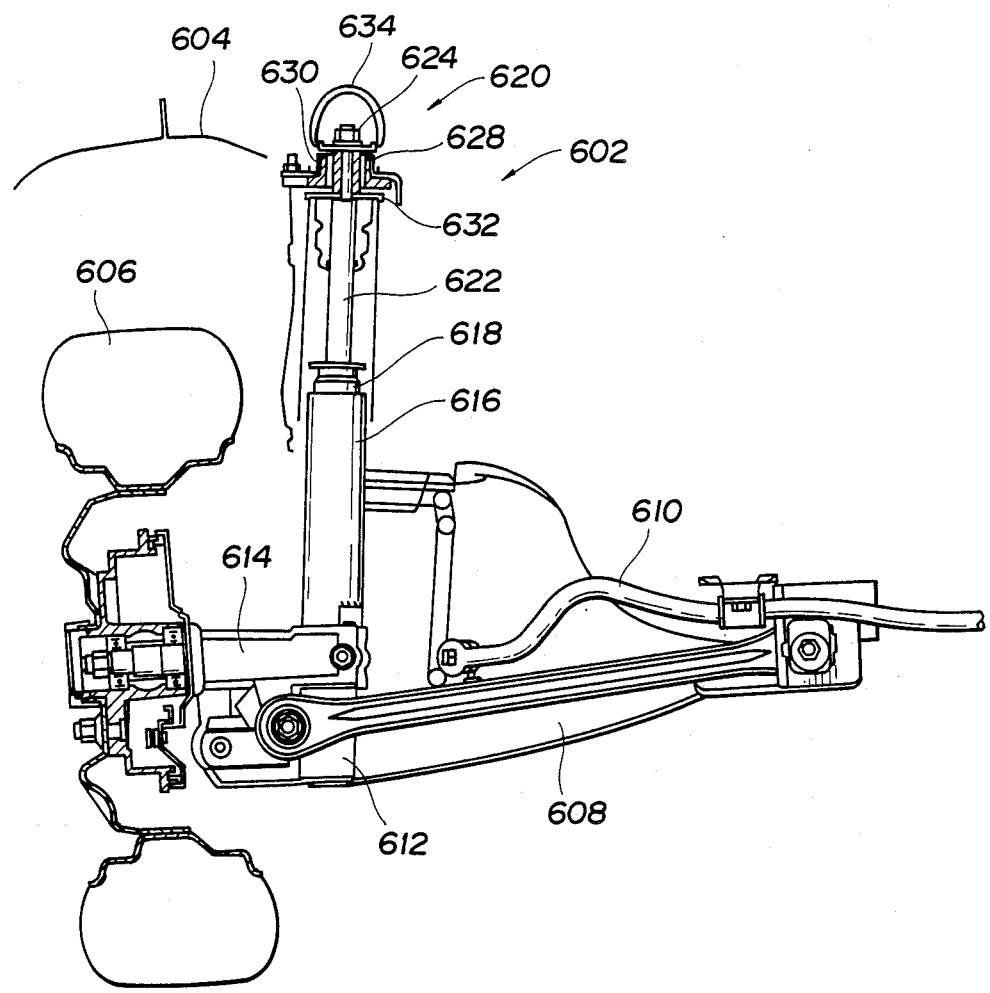
FIG. 15 is a schematic explanatory diagram of a suspending apparatus according to a fifth variation of the invention.
Figure 16:
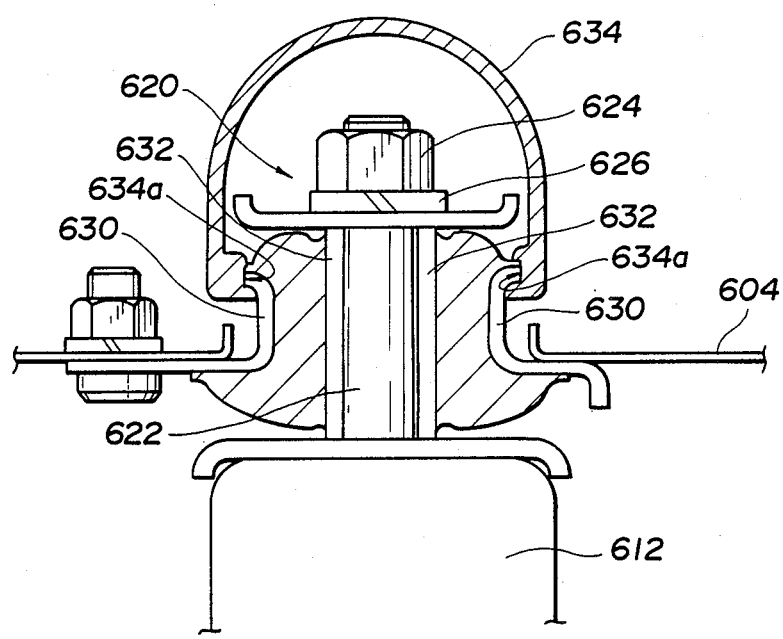
FIG. 16 is an enlarged cross sectional view of the main section of the suspending apparatus of FIG. 15.
Figure 17:
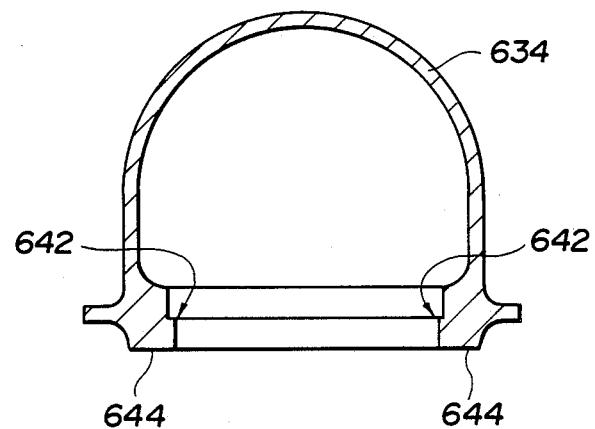
FIG. 17 is an enlarged cross sectional view of a cover portion showing a modification of a part shown in FIG. 16.

FIGS. 15 to 17 show a fifth variation wherein reference numeral 602 denotes a suspending apparatus for vehicles, 604 a vehicle body, 606 a wheel, 608 a lower arm, and 610 a stabilizer. A strut 612 is provided between the vehicle body 604 and the lower arm 608. The wheel 606 is attached to the lower end of the strut 612 by a knuckle 614. The strut 612 has an outer cylinder member 616, an inner cylinder member 618 which is concentric with the outer cylinder member, an attaching portion 620 extending axially from the inner and outer cylinder members, and a coil spring (not shown). The attaching portion 620 comprises a rod portion 622, a screw portion 624, and a washer 626 (FIG. 16).

The strut 612 and vehicle body 604 are brought into engagement through a strut mount 628. The strut mount 628 has an annular structure and receives the attaching portion 620 in a central opening thereof. The strut mount 628 is supported by first and second supporting members 630 and 632 from the outside and inside along its respective outer and inner peripheral surfaces, and projects through the vehicle body 604. The attaching portion 620 of the strut 612 penetrates the strut mount 628 and also projects through the vehicle body 604. A cover portion 634 engages the annular peripheral edge portion of the first supporting member 630 so as to cover the strut mount 628 and the attaching portion 620, both of which project through the vehicle body 604. A concave portion (or annular groove) 634a is formed on the inner periphery at the opening edge of the lower portion of the cover portion 634, whereby the concave portion 634a is fitted to the peripheral edge portion of the first supporting member 630.

When the vehicle runs, the vibration and noise which are caused by irregularities of the road surface are propagated to the strut 612 through the wheel 606. The vibration is reduced by the outer and inner cylinder members 616 and 618 of the strut 612. The remaining vibration would generally be expected to propagate from the rod portion 622 of the attaching portion 620 to the vehicle body 604. However, the attaching portion 620 engages the first supporting member 630 through the strut mount 628, and the cover portion 634 is in engagement with the first supporting member 630, so that the remaining vibration is reduced by the strut mount 628.

Consequently, when the cover portion 634 is attached, it is fitted to the peripheral edge portion of the first supporting member 630 in order to cover the strut mount 628 and attaching portion 620. Therefore, the durability between the strut mount 628 and the attaching portion 620 can be improved, prolonging their useful life. The propagation of the remaining vibration and noise to the vehicle body 604 can be efficiently reduced. Since the cover portion 634 is fitted to the peripheral edge portion of the first supporting member 630, the size and weight of the cover portion 634 can be reduced, which reduces the amount of material needed to produce the cover portion 634, thus reducing cost.

In FIGS. 15-16, the cover portion 634 has been fitted to the peripheral edge portion of the first supporting member 630 at a distance away from the vehicle body 604. However, as shown in FIG. 17, it is also possible to construct the cover portion 634 in a manner such that a height difference portion 642 is formed in the lower side opening portion (below the annular groove which engages the first supporting member 630), and an annular contacting portion 644 contacts the vehicle body 604, thereby positioning the cover portion 634.

Figure 18:
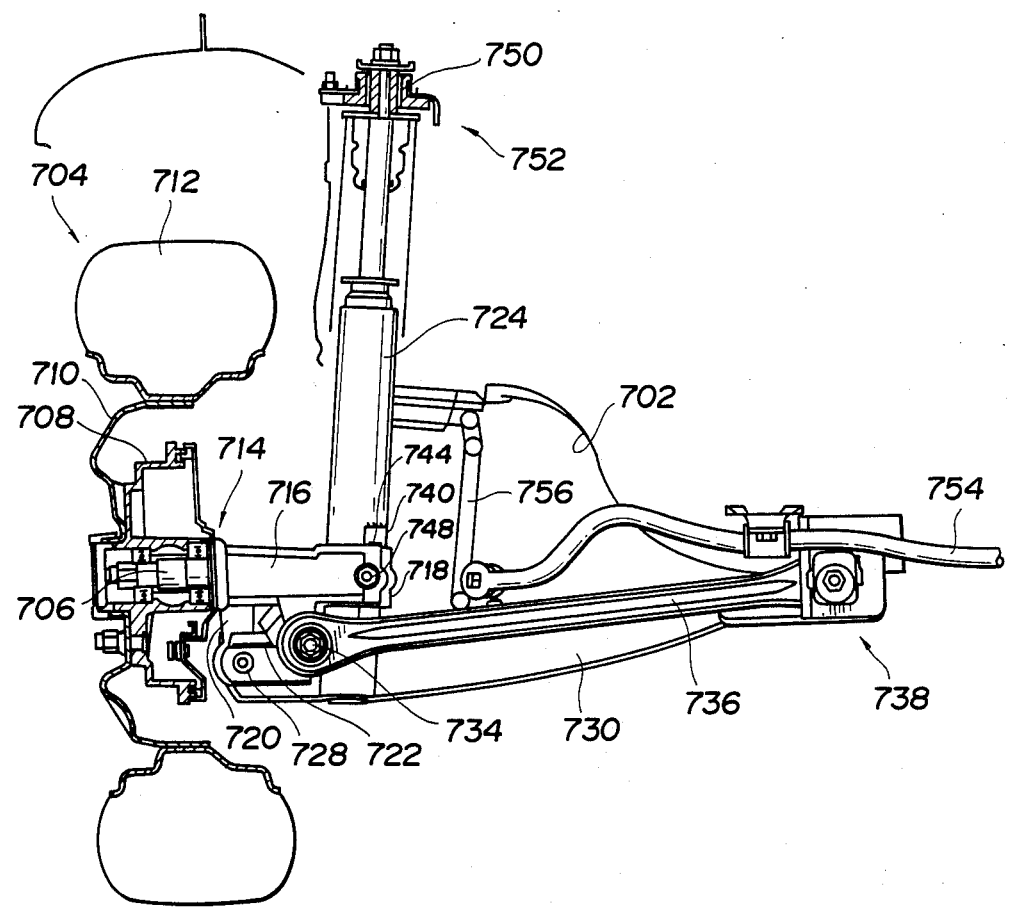
FIG. 18 is a schematic explanatory diagram of a suspending apparatus according to a sixth variation of the invention.
Figure 19:
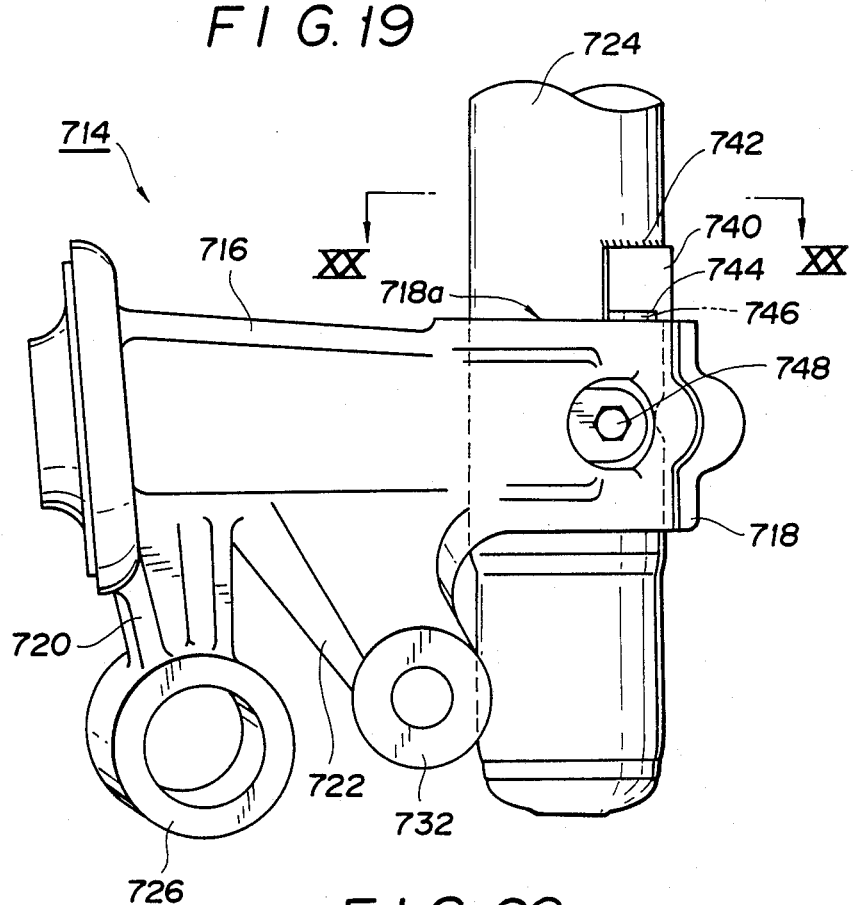
FIG. 19 is a side elevational view of a suspension knuckle of FIG. 18.
Figure 20:
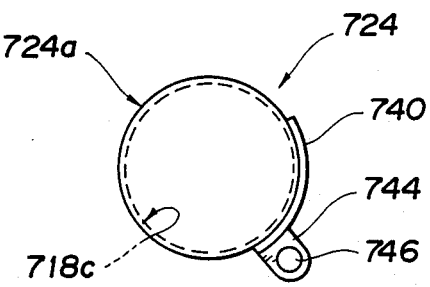
FIG. 20 is a cross sectional view taken along line XX—XX in FIG. 19.
Figure 21:
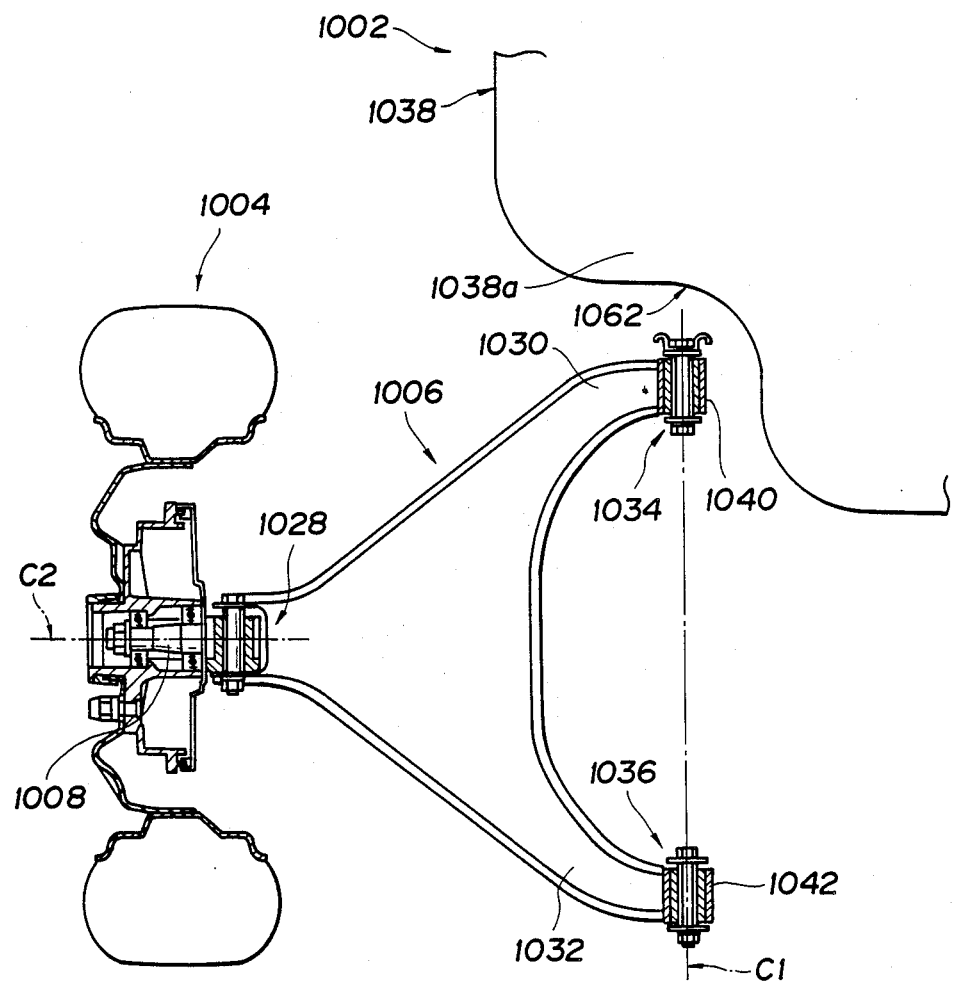
FIG. 21 is a schematic plan view of a conventional suspending apparatus for vehicles.
Figure 29:
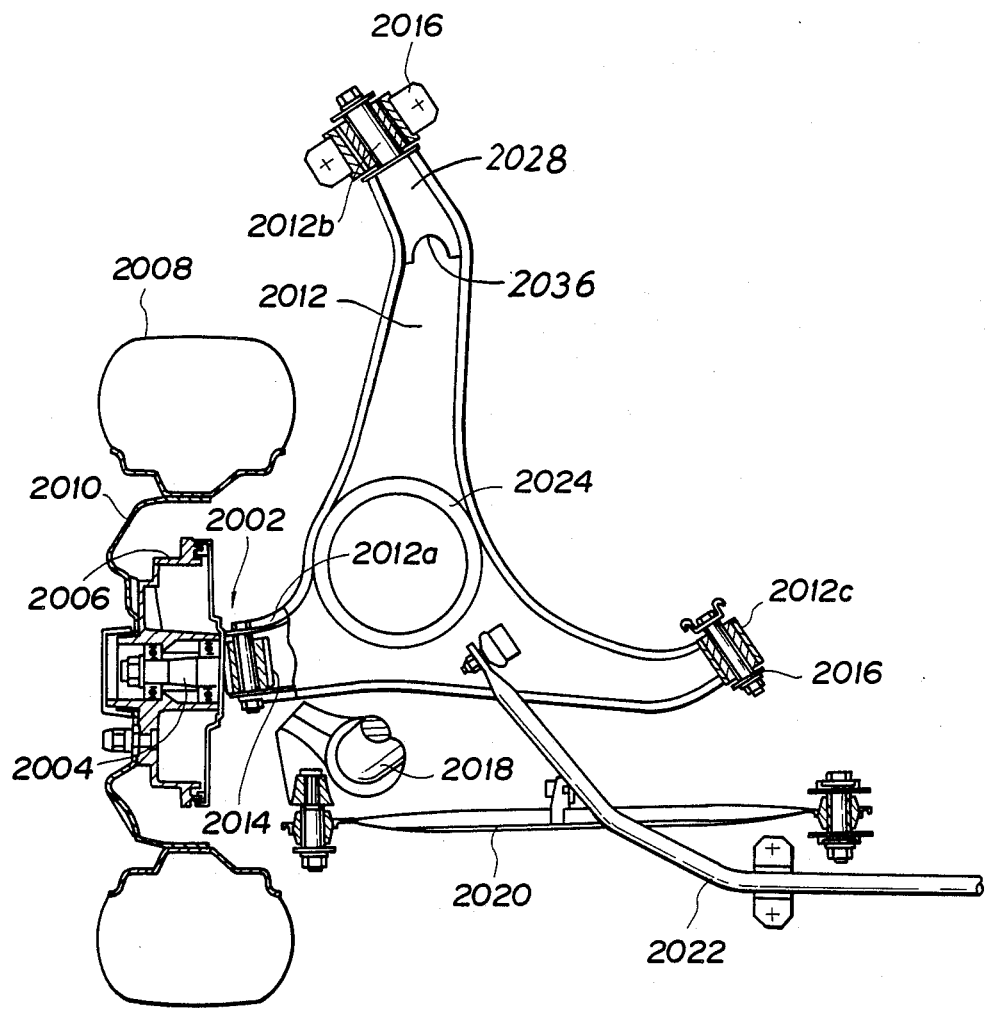
FIG. 29 is a schematic explanatory diagram of another conventional suspending apparatus for vehicles.
Figure 30:
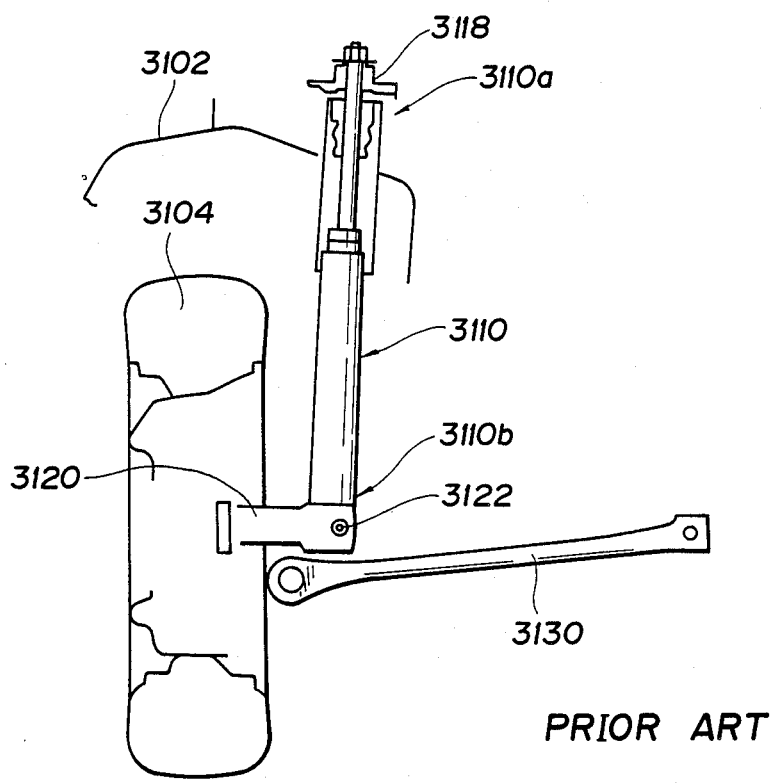
FIG. 30 is a schematic enlarged front view of a further conventional suspending apparatus for vehicles.
Figure 31:
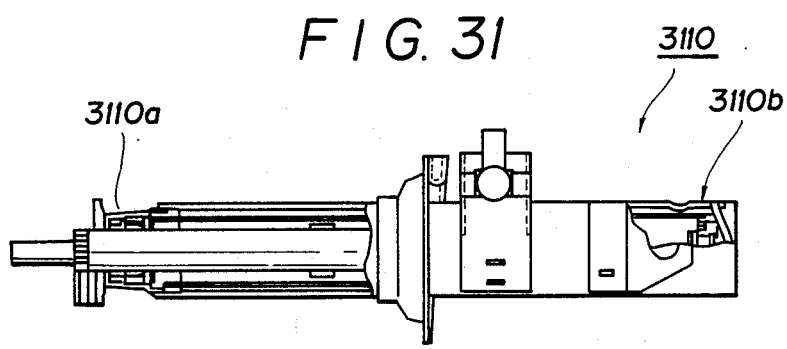
FIG. 31 is a schematic enlarged cross sectional view of a conventional strut.
Figure 32:
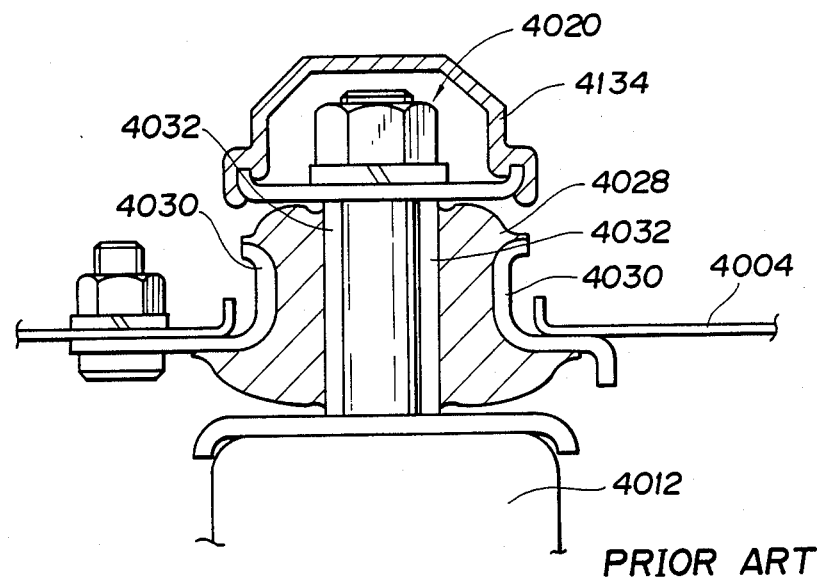
FIGS. 32 and 33 are enlarged cross sectional views of conventional cover portions for struts.
Figure 33:
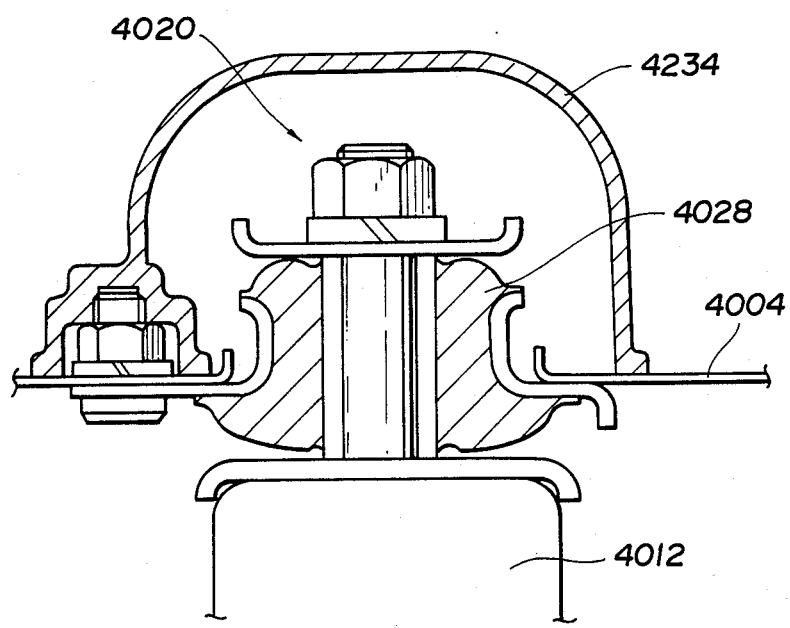

FIGS. 18 to 20 show a sixth variation wherein reference numeral 702 denotes a vehicle body, and 704 indicates a wheel assembly. The wheel assembly 704 is constructed by attaching a tire 712 to a hub 708 and a wheel 710 which are fixed to the wheel shaft 706.

The wheel shaft 706 is axially attached to a suspension knuckle 714. As shown in FIG. 19, the suspension knuckle 714 has a boss portion 718 at the free end of an arm 716 for holding the strut, an arm 720 for attaching a lower arm thereto, and an arm 722 for attaching a toe control rod. The boss portion 718 functions as a damper and engages an outer surface 724a of a strut 724. One end of a lower arm 730 is connected to a lower arm attaching portion 726 at a free end of the arm 720 by a supporting device 728 for the lower arm (FIG. 18). One end of a toe control rod 736 is supported to an attaching portion 732 at a free end of the arm 722 by a connecting device 734 for the rod. The other ends of the lower arm 730 and toe control rod 736 are attached to a first supporting portion 738 on the central side of the vehicle body 702.

When the strut 724 is inserted into the boss portion 718 and attached, a holding bracket 740 is used (FIGS. 19-20). The bracket 740 functions as a positioning device, stopper, or the like and is formed in a curved shape so as to conform with the outer surface 724a of the strut 724. The holding bracket 740 is fixedly attached to the outer surface 724a of the strut 724 by welding or the like. A projecting portion 744 is formed by bending a part of the bracket 740. The projecting portion 744 is bent so as to be retained to an upper edge surface 718a of the boss portion 718. As shown in FIGS. 19 and 20, a supporting hole 746 is formed in the projecting portion 744. That is, when the strut 724 is handled (for example, for surface treatment), the strut 724 is hung down by using the supporting hole 746 in the projecting portion 744. The strut 724 is inserted into an opening 718c of the boss portion 718, and the strut 724 is fixedly held by a clamping bolt 748. The projecting portion 744 is bent to an extent such as not to exert any influence on the holding function of the strut 724. Further, a strut mount 750 is provided at an end portion of the strut 724 and is attached to the vehicle body 702 via a second supporting portion 752. Reference numeral 754 denotes a stabilizer and 756 indicates a spring.

The projecting portion 744 is bent so as to project almost perpendicularly from the outer surface 724a of the strut 724. The bracket 740 is fixedly attached, at 742, to the outer surface 724a by welding or the like. If it is intended to execute a surface treatment such as painting, plating, or the like, the strut 724 can be hung down or fixed by using the supporting hole 746 of the portion 744 of the bracket 740. Thus, the strut 724 can be easily handled, surface treating work and the like, can be easily executed, and there is no need to provide other separate parts such as a bracket for hanging the strut and the like. Therefore, costs can be reduced. Other retaining devices, such as a hook or the like may alternatively be provided on the projecting portion 744 for the purpose of supporting the strut 724 for hanging or the like while, for example, its surface is being treated.

The strut 740 is inserted into the opening 718c of the boss portion 718. The projecting portion 744 seats on the upper edge surface 718a of the boss portion 718. With the projecting portion 744 seated on the boss edge surface 718a, the clamping bolt 748 is tightened, thereby fixing the strut 724 to the boss portion 718.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property of privilege is claimed are defined as follows:

1. A suspending apparatus for vehicles, comprising:
   a suspension arm having a wheel-side supporting portion and two vehicle body side supporting portions so as to support a wheel so that the wheel can vertically oscillate relative to a vehicle body;
   a first centerline connecting said two vehicle body side supporting portions extending obliquely relative to a second centerline defined by a wheel shaft which supports the wheel such that said first centerline does not perpendicularly cross said second centerline;
   said two vehicle body side supporting portions being positioned such that said first centerline passes through a corner portion of a vehicle component;
   a side surface of said suspension arm as extending between said two vehicle body side supporting portions formed and positioned so as to extend along the corner portion of the vehicle component while being spaced therefrom and;
   said suspension arm including a base plate and a subplate, said base plate having a substantially C-shaped cross section including opposed side wall portions, in which side edges of the subplate are respectively fixedly attached to free edges of said side wall portions, said subplate being bent inwardly relative to the C-shaped section so that a free edge thereof is disposed between the base plate side wall portions of the suspension arm in order to reduce concentration of stresses in the suspension arm at the free edge of the subplate.

2. An apparatus according to claim 1, wherein said suspension arm is coupled with said vehicle body by a strut, wherein said suspension arm is integrally formed by a first arm member extending from an attaching position of the wheel toward the front side of the vehicle body and a second arm member extending from the attaching position of the wheel toward the inside of the vehicle body, and wherein said first arm member includes an attaching edge portion which is attached to the vehicle body side through a bracket, said attaching edge portion including a projecting portion having a larger cross sectional shape than said bracket.

3. An apparatus according to claim 1, including means for coupling parts to a bottom surface of the vehicle body by threaded fasteners, said coupling means including a bracket having an opening therein defined by a peripheral wall, said bracket having a flange-shaped wall portion which is formed at lower edge of said peripheral wall and projects inwardly therefrom, and the parts are coupled with the peripheral wall of the bracket by threaded fasteners.

4. An apparatus according to claim 1, wherein said vehicle component is a fuel tank.

5. An apparatus according to claim 1, wherein the subplate is fixed to the base plate closely adjacent said firs centerline and projects along said arm away from said first centerline and terminates in said free edge, said subplate having only a part of the length thereof as terminating at said free edge bent inwardly so as to be disposed between the side wall portions of the base plate whereby said free edge is disposed approximately on the neutral bending axis of the base plate.

6. A suspending apparatus for vehicles, comprising:
a strut for connecting between a suspension arm and a vehicle body, suspension knuckle means attached to said suspension arm and defining an opening for receiving said strut, a lower end portion of said strut being inserted in said opening, an outer diameter of said lower end portion of said strut being small to facilitate a deep insertion of said strut into said opening in order to decrease the projection amount by which an upper end portion of the strut projects into the vehicle body, said strut including a holding bracket, said holding bracket being provided for said suspension knuckle means to thereby hold said strut, a part of said holding bracket being bent to form a projecting portion, and means provided on said projecting portion for permitting pendent support of said strut.

7. A suspending apparatus for vehicles, comprising:
a strut for connecting between a suspension arm and a vehicle body, means attached to said suspension arm and defining an opening for receiving said strut, a lower end portion of said strut being inserted in said opening, an outer diameter of said lower end portion of said strut being small to facilitate a deep insertion of aid strut into said opening in order to decrease the projection amount by which an upper end portion of the strut projects into the vehicle body, said suspension arm and the vehicle body being connected by said strut through a strut mount which has a central opening therein and is supported by first and second supporting members along respective outside and inside peripheries thereof, said strut including an attaching portion at one end thereof which is received in said opening in said strut mount and fixes said strut mount, said attaching portion projecting through the vehicle body, and a cover portion to cover said attaching portion, said cover portion engaging a peripheral edge portion of the first supporting member to support the strut mount along said outside periphery thereof.

* * * * *

UNITED STATES PATENT AND TRADEMARK OFFICE
CERTIFICATE OF CORRECTION

PATENT NO. : 4,986,566

DATED : January 22, 1991

INVENTOR(S) : Yutaro Nishino et al

It is certified that error appears in the above-identified patent and that said Letters Patent is hereby corrected as shown below:

Column 15, line 22; after "at" insert ---a---.

Column 15, line 30; change "firs" to ---first---.

Column 16, line 22; change "aid" to ---said---.

Signed and Sealed this

Sixth Day of October, 1992

Attest:

DOUGLAS B. COMER

*Attesting Officer*       *Acting Commissioner of Patents and Trademarks*